United States Patent
Wali (10) Patent No.: US 12,547,452 B2
(45) Date of Patent: Feb. 10, 2026

(54) COMMON CONTAINER INTERFACE AND METHOD FOR RUNNING DIFFERENT PLATFORM SCRIPTS USING COMMON CONTAINER INTERFACE

(71) Applicant: JPMorgan Chase Bank, N.A., New York, NY (US)

(72) Inventor: Esha Wali, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 503 days.

(21) Appl. No.: 18/131,186

(22) Filed: Apr. 5, 2023

(65) Prior Publication Data

US 2024/0256329 A1     Aug. 1, 2024

(30) Foreign Application Priority Data

Jan. 28, 2023    (IN) .............................. 202311005681

(51) Int. Cl.
    *G06F 9/44*        (2018.01)
    *G06F 9/48*        (2006.01)
    *G06F 11/34*      (2006.01)
(52) U.S. Cl.
    CPC ........ *G06F 9/4881* (2013.01); *G06F 11/3409* (2013.01)

(58) Field of Classification Search
    CPC ....................................................... G06F 9/4881
    USPC ........................................................... 718/102
    See application file for complete search history.

(56) References Cited

U.S. PATENT DOCUMENTS

| | | | |
|---|---|---|---|
| 2017/0371638 A1* | 12/2017 | Folco | G06F 11/07 |
| 2018/0365006 A1* | 12/2018 | Carvalho | G06F 8/61 |
| 2022/0091865 A1* | 3/2022 | Godowski | G06F 3/0631 |
| 2023/0376360 A1* | 11/2023 | Griffin | G06F 9/52 |

* cited by examiner

*Primary Examiner* — Timothy A Mudrick
(74) *Attorney, Agent, or Firm* — GREENBLUM & BERNSTEIN, P.L.C.

(57) ABSTRACT

A common container interface and a method of using the same for running different platform scripts on a same user window are disclosed. A processor via the common container interface is configured to: (1) receive information related to an event broadcasted by a first library; (2) retrieve information of a first active task associated with a first platform; (3) detect a performance of a second active task associated with a second platform; (4) identify a set of components loaded in the common container interface; (5) process the set of components loaded in the common container interface; (6) retrieve components of a second library; and (7) perform a final task based on the components retrieved from the second library, where the final task is associated with the first active task and the second platform.

18 Claims, 5 Drawing Sheets

COMMON CONTAINER INTERFACE AND METHOD FOR RUNNING DIFFERENT PLATFORM SCRIPTS USING COMMON CONTAINER INTERFACE

CROSS-REFERENCE TO RELATED APPLICATIONS

This application claims priority benefit from Indian Application No. 202311005681, filed on Jan. 28, 2023 in the India Patent Office, which is hereby incorporated by reference in its entirety.

BACKGROUND

Field of the Disclosure

This technology generally relates to user interface technologies and more particularly relates to at least one user interface container application, that may run different scripts based on different technologies in a single web container.

Background Information

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as an admission of the prior art.

User interface (UI) technologies often change and upgrade at frequent intervals of time. There are certain projects which run for a long time and take several months or even years to get completed. Since the UI technologies evolve at a much faster pace, it happens quite often that a newer version of an existing platform technology, that is, a better technology is available even before a project reaches its midpoint. This results in development teams: (i) continuing with an older version of the existing platform technology that is not desirable, or (ii) writing a part of the project on one platform and another part of the same project on a relatively new platform, or (iii) abandoning the project completely and starting afresh using the newer version of the existing platform technology.

For projects looking to upgrade to a modern user interface technology stack, particularly incompatible ones, options are to either start from scratch or to maintain two separate applications, which often results in overheads. Further, continuing with older versions of the existing platform technology, or writing the part of the project on one platform and the another part of the same project on the relatively new platform, leads to a bad user experience or at least a sub-optimum user experience. Also, abandoning the project completely and starting afresh again leads to overheads in terms of costs of resources, and maintenance as well as time.

In the currently existing solutions, in a UI container, one may load scripts written using one platform technology at a time. There is no existing solution that is able to make scripts written on different technology platforms, for example, one written in ANGULAR, or VUE, and another written in REACT, or any such script technology, interact with each other or be shown to a user in a way that the user may not be able to point out a difference between the two.

Hence, in view of these and other existing limitations, there is a need to provide a solution that may remove the need to rewrite the old scripts on new technologies and may reuse old scripts written on older versions of a technology and wherever the scripts are written on different platform technologies it may run together in a single web container. This would eradicate the need to maintain separate applications saving considerable time and efforts. Also, by implementing such a solution, an end user would get a seamless cohesive experience of a single-page application.

SUMMARY

The present disclosure, through one or more of its various aspects, embodiments, and/or specific features or sub-components, provides, inter alia, various systems, servers, devices, methods, media, programs, and platforms for running different platform scripts on a same user window.

According to an aspect of the present disclosure, a method for running different platform scripts on a same user window is disclosed, where the method is being executed by at least one processor. The method may include receiving, by the at least one processor at a common container interface, first information related to an event broadcasted by a first library, wherein the first library is associated with a first platform; retrieving, by the at least one processor via the common container interface, second information of a first active task, wherein the first active task is associated with the first platform; detecting, by the at least one processor via the common container interface, a performance of a second active task, wherein the second active task is associated with a second platform; identifying, by the at least one processor via the common container interface, a set of components loaded in the common container interface based on the detection of the performance of the second active task; processing, by the at least one processor via the common container interface, the set of components loaded in the common container interface; retrieving, by the at least one processor via the common container interface, at least one component from a second library, based on the processing, wherein the second library is associated with the second platform; and performing, by the at least one processor via the common container interface, a final task based on the at least one component retrieved from the second library, wherein the final task is associated with the first active task and the second platform.

In accordance with an exemplary embodiment, the processing the set of components loaded in the common container interface includes one from among: removing all components of the first library from the common container interface and generating a confirmation of the removal of all the components; and generating a confirmation of a prior-removal of all components of the first library.

In accordance with an exemplary embodiment, the retrieving the at least one component from the second library includes retrieving, via the common container interface, an initialization procedure for initializing the at least one component of the second library.

In accordance with an exemplary embodiment, the retrieving the at least one component from the second library is based on a processing determined by a priority order provided to the common container interface.

In accordance with an exemplary embodiment, prior to the receiving the first information related to the event broadcasted by the first library, the method may include loading, by a memory connected to the common container interface, at least one component of a plurality of libraries including at least one component of the first library and the at least one component of the second library, wherein the at least one component of the first library and the at least one component of the second library are conflicting.

In accordance with an exemplary embodiment, the step of retrieving the at least one component from the second library further includes applying, by the at least one processor via the common container interface, a set of user context settings.

According to another aspect of the present disclosure, a computing device for running different platform scripts on a same user window is disclosed. The computing device includes a processor including a common container interface; and a memory connected to the processor. The processor, via the common container interface, may be configured to: receive first information related to an event broadcasted by a first library, wherein the first library is associated with a first platform; retrieve second information of a first active task, wherein the first active task is associated with the first platform; detect a performance of a second active task, wherein the second active task is associated with a second platform; identify a set of components loaded in the common container interface based on the detection of the performance of the second active task; process the set of components loaded in the common container interface; retrieve at least one component from a second library, based on the processing, wherein the second library is associated with the second platform; and perform a final task based the at least one component retrieved from the second library, wherein the final task is associated with the first active task and the second platform.

In accordance with an exemplary embodiment, the processor may be further configured to perform one from among: remove all components of the first library from the common container interface and generate a confirmation of the removal of all the components; and generate a confirmation of a prior-removal of all components of the first library.

In accordance with an exemplary embodiment, the processor, while retrieving the at least one component from the second library, may be further configured to retrieve an initialization procedure for initializing the at least one component of the second library.

In accordance with an exemplary embodiment, the processor may be further configured to retrieve the at least one component from the second library based on a processing determined by a priority order provided to the common container interface.

In accordance with an exemplary embodiment, the memory may be configured to load at least one component of a plurality of libraries including at least one component of the first library and the at least one component of the second library, prior to the common container interface receiving the first information related to the event broadcasted by the first library, wherein the at least one component of the first library and the at least one component of the second library are conflicting.

In accordance with an exemplary embodiment, the processor, while retrieving the at least one component from the second library, may be further configured to apply a set of user context settings.

According to yet another aspect of the present disclosure, a non-transitory computer readable storage medium storing instructions for running different platform scripts on a same user window is disclosed. The instructions include executable code which, when executed by a processor, causes the processor to: receive first information related to an event broadcasted by a first library, wherein the first library is associated with a first platform; retrieve second information of a first active task, wherein the first active task is associated with the first platform; detect a performance of a second active task, wherein the second active task is associated with a second platform; identify a set of components loaded in the common container interface based on the detection of the performance of the second active task; process the set of components loaded in the common container interface; retrieve at least one component from a second library, based on the processing, wherein the second library is associated with the second platform; and perform a final task based on the at least one component retrieved from the second library, wherein the final task is associated with the first active task and the second platform.

In accordance with an exemplary embodiment, the executable code, when executed, further causes the processor to perform, via the common container interface, one from among: remove all components of the first library from the common container interface and generate a confirmation of the removal; and generate a confirmation of a prior-removal of all components of the first library.

In accordance with an exemplary embodiment, the executable code, when executed, further causes the processor to: retrieve, via the common container interface, an initialization procedure for initializing the at least one component of the second library.

In accordance with an exemplary embodiment, the executable code, when executed, further causes the processor to: retrieve, via the common container interface, the at least one component from the second library based on a processing determined by a priority order provided to the common container interface.

In accordance with an exemplary embodiment, the executable code, when executed, further causes the processor to: enable a memory to load at least one component of a plurality of libraries including at least one component of the first library and the at least one component of the second library, prior to the common container interface receiving the first information related to the event broadcasted by the first library, wherein the at least one component of the first library and the at least one component of the second library are conflicting.

In accordance with an exemplary embodiment, the executable code, when executed, further causes the processor to: apply, via the common container interface, a set of user context settings, while retrieving the at least one component from the second library.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

DETAILED DESCRIPTION

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases/terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable storage medium having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

To overcome problems associated with running various scripts based on different technologies in a single web container, the present disclosure provides a method and a system for running different platform scripts on a same user window. Here, the same user window refers to the single web container. Thus, the present disclosure overall provides a hybrid, reusable user interface (UI) container that enables running applications based on the different technologies. These different technologies, or as used herein, platform(s), such as ANGULAR, REACT, Jquery, Vue, etc. are based on a native technology platform javascript. Also, a 'hybrid container' or 'common container interface' or 'single web container' or 'application container' or 'UI container' or 'base container' may also be written in this native technology platform. By implementing features of the present disclosure, an old code written on one technology may be reused without the need for rewriting the same on a different platform, and applications based on different technologies can run together, saving considerable time and efforts of developers. The solution proposed by the present disclosure may be utilized with any technology or platform.

In overall operation, the application container or the UI container or the common container interface loads, say, three distinct divisions or sections which serve as root for displaying content per library. Say there are two libraries: Library 1 and Library 2. Libraries that are non-contradicting may be injected as scripts. Cascading style sheets (CSS) which are non-contradicting may be injected as links. A library specific bootstrapping code is written on a platform which on basis of which screen is loaded loads respective library. Each component belonging to a specific library, extends from a base component, whose responsibility is to check if all scripts and CSS classes are loaded appropriately when initialized, and on exit or destroy, respective scripts and CSS classes are offboarded. An event may be triggered for displaying content which first calls processor which deduces which base component to choose and trigger further sequence of events, in a case for example, a menu click becomes trigger. In general, the event may be any interactive event. The base component may also be configured to have event listeners added to listen to specific events, base component wants to send. Also, an event handler, that may be a part of a base container checks if all contradicting scripts and CSS of other libraries are offloaded or detached from a head tag. Then loads scripts and CSS of a desired library by attaching it to the head tag in an order of priority. The common container interface also contains a priority order of sequence of actions or events. The content may be loaded into respective root division, while setting a display of other divisions to none. Custom objects or parameters required during an initial startup for a library, for example, a user context etc., may be injected during an initialization or the initial startup. The base container also may send specific messages or sets the user context to each of the libraries via injection during the initialization. Each library when invoked, thus, has no or minimal conflicts and behaved independently to each other. A user is agnostic to all above steps and even though there is transition between the libraries, the experience is seamless.

Figure 1:
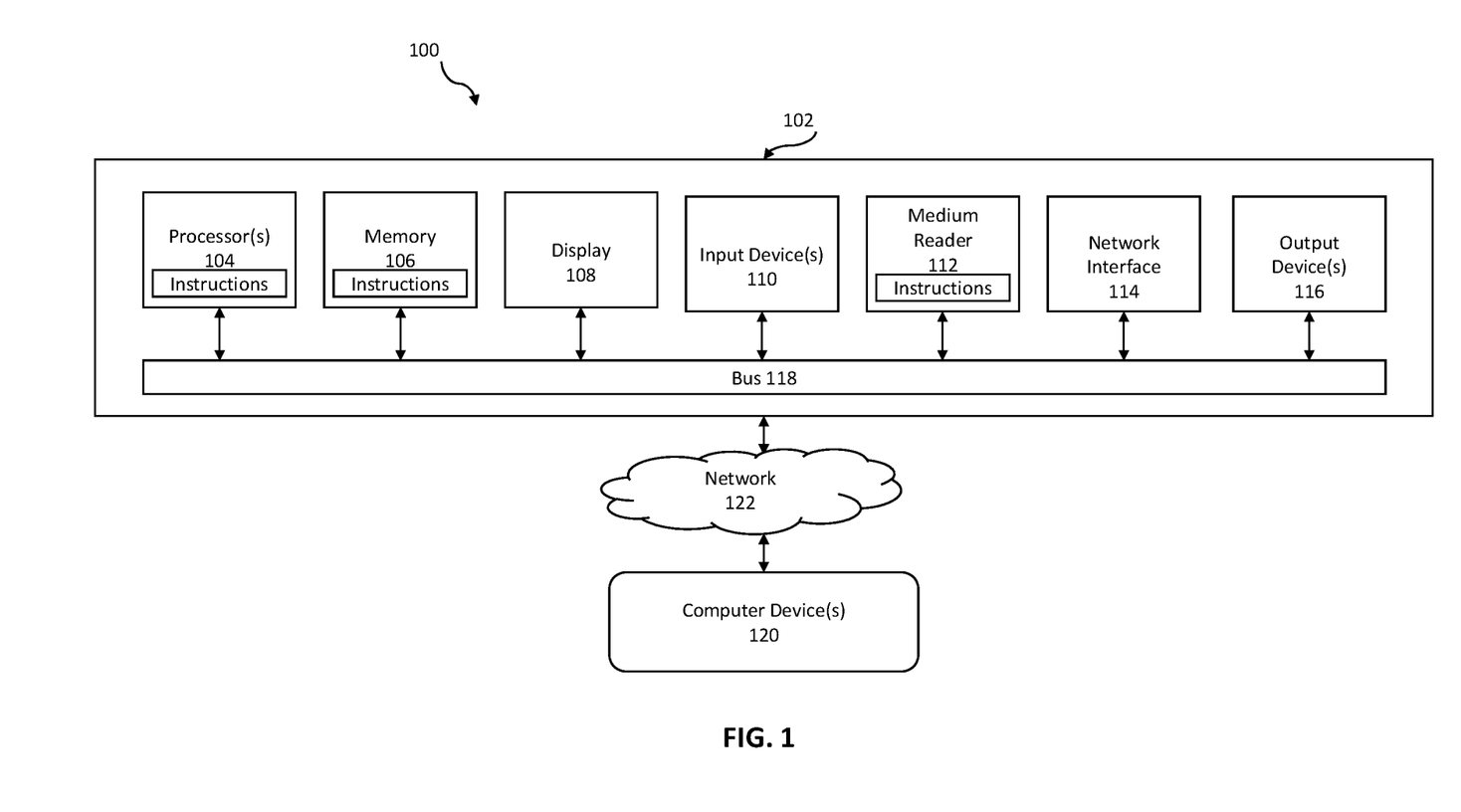
FIG. 1 illustrates an exemplary computer system for running different platform scripts on a same user window in accordance with an exemplary embodiment.

FIG. 1 is an exemplary system for use in accordance with the embodiments described herein. The system 100 is generally shown and may include a computer system 102, also known as computing device 102, or apparatus 102 which is generally indicated for running different platform scripts on a same user window.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in such cloud-based computing environment.

In a networked deployment, the computer system 102 may operate in the capacity of a server or as a client user computer in a server-client user network environment, a client user computer in a cloud-based computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. As regards the present invention, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but is not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but is not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for running different platform scripts on a same user window based on an execution of one or more instructions.

Figure 2:
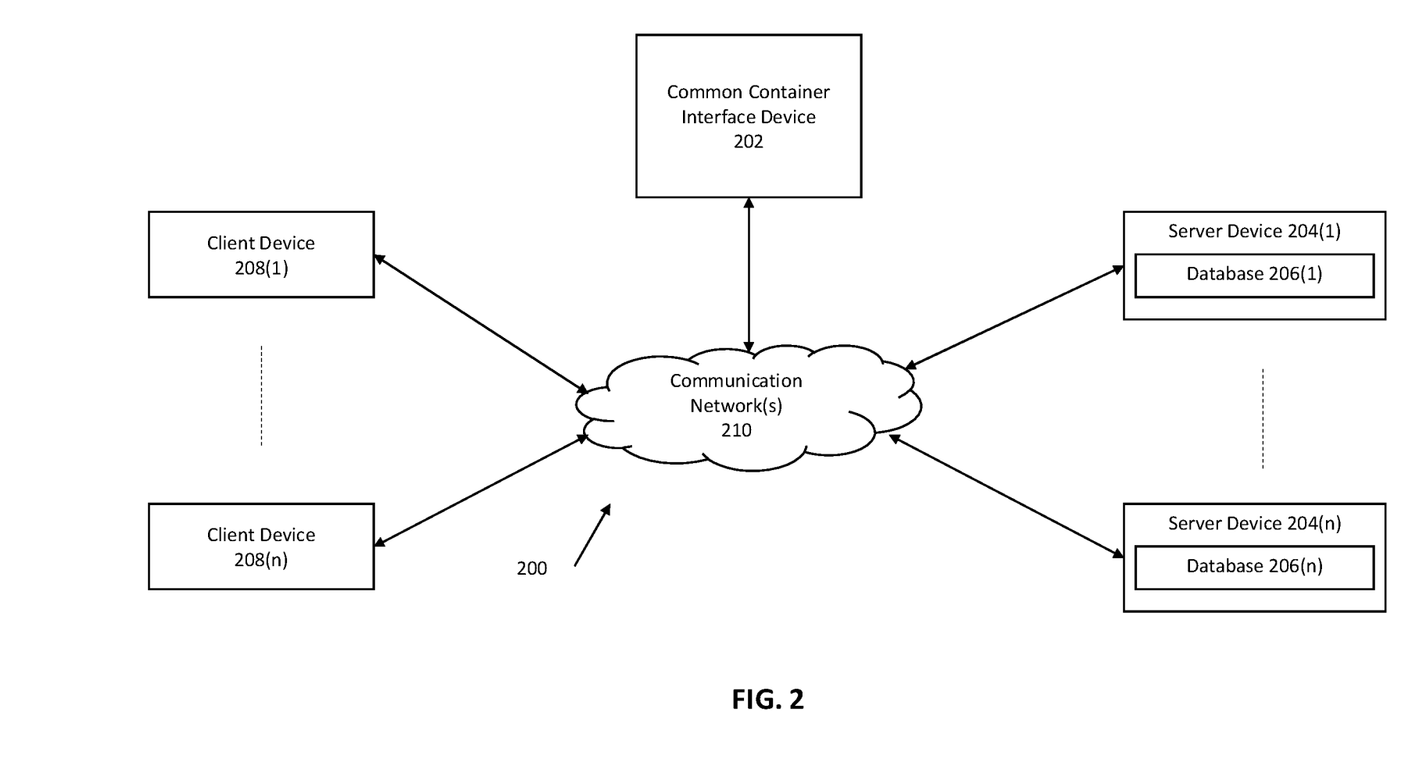
FIG. 2 illustrates an exemplary diagram of a network environment for running different platform scripts on a same user window in accordance with an exemplary embodiment.

Referring to FIG. 2, a schematic of an exemplary network environment 200 for implementing a method for running different platform scripts on a same user window is illustrated in accordance with an exemplary embodiment. In an exemplary embodiment, the method is executable on any networked computer platform, such as, for example, a personal computer (PC).

The method for running the different platform scripts on the same user window may be implemented by a Common Container Interface (CCI) device 202. The CCI device 202 may be same or similar to the computer system 102 as described with respect to FIG. 1. The CCI device 202 may store one or more applications that can include executable instructions that, when executed by the CCI device 202, cause the CCI device 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CCI device 202 itself, may be located in virtual server(s) running in a cloud-based computing environment rather than being tied to one or more specific physical network computing devices. Also, the application(s) may be running in one or more virtual machines (VMs) executing on the CCI device 202. Additionally, in one or more embodiments of this technology, the virtual machine(s) running on the CCI device 202 may be managed or supervised by a hypervisor.

In the network environment 200 of FIG. 2, the CCI device 202 is coupled to a plurality of server devices 204(1)-204(n) that hosts a plurality of databases 206(1)-206(n), and also to a plurality of client devices 208(1)-208(n) via communication network(s) 210. A communication interface of the CCI device 202, such as the network interface 114 of the computer system 102 of FIG. 1, operatively couples and communicates between the CCI device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CCI device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable storage media, and CCI devices 202 that efficiently implement the method for running the different platform scripts on the same user window, the method being implemented by at least one processor 104.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CCI device 202 may be a standalone device or integrated with one or more other devices or apparatuses, such as one or more of the server devices 204(1)-204(n), for example. In one particular example, the CCI device 202 may include or be hosted by one of the server devices 204(1)-204(n), and other arrangements are also possible. Moreover, one or more of the devices of the CCI device 202 may be in a same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CCI device 202 via the communication network(s) 210 according to Hypertext Transfer Protocol (HTTP)-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical data related to various libraries that might be needed to be loaded at various instances, various bootstrapping or initializing of scripts and procedures, various user context settings, etc.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CCI device 202 via the communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, e.g., a smartphone.

The client devices 208(1)-208(n) may run interface applications, such as standard web browsers or standalone client applications, which may provide an interface to communicate with the CCI device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CCI device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CCI device 202, the server devices 204(1)-204(n), or the client devices 208(1)-208(n), for example, may be configured to operate as virtual instances on the same physical machine. In other words, one or more of the CCI device 202, the server devices 204(1)-204(n), or the client devices 208(1)-208(n) may operate on the same physical device rather than as separate devices communicating through communication network(s) 210.

Additionally, there may be more or fewer CCI devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
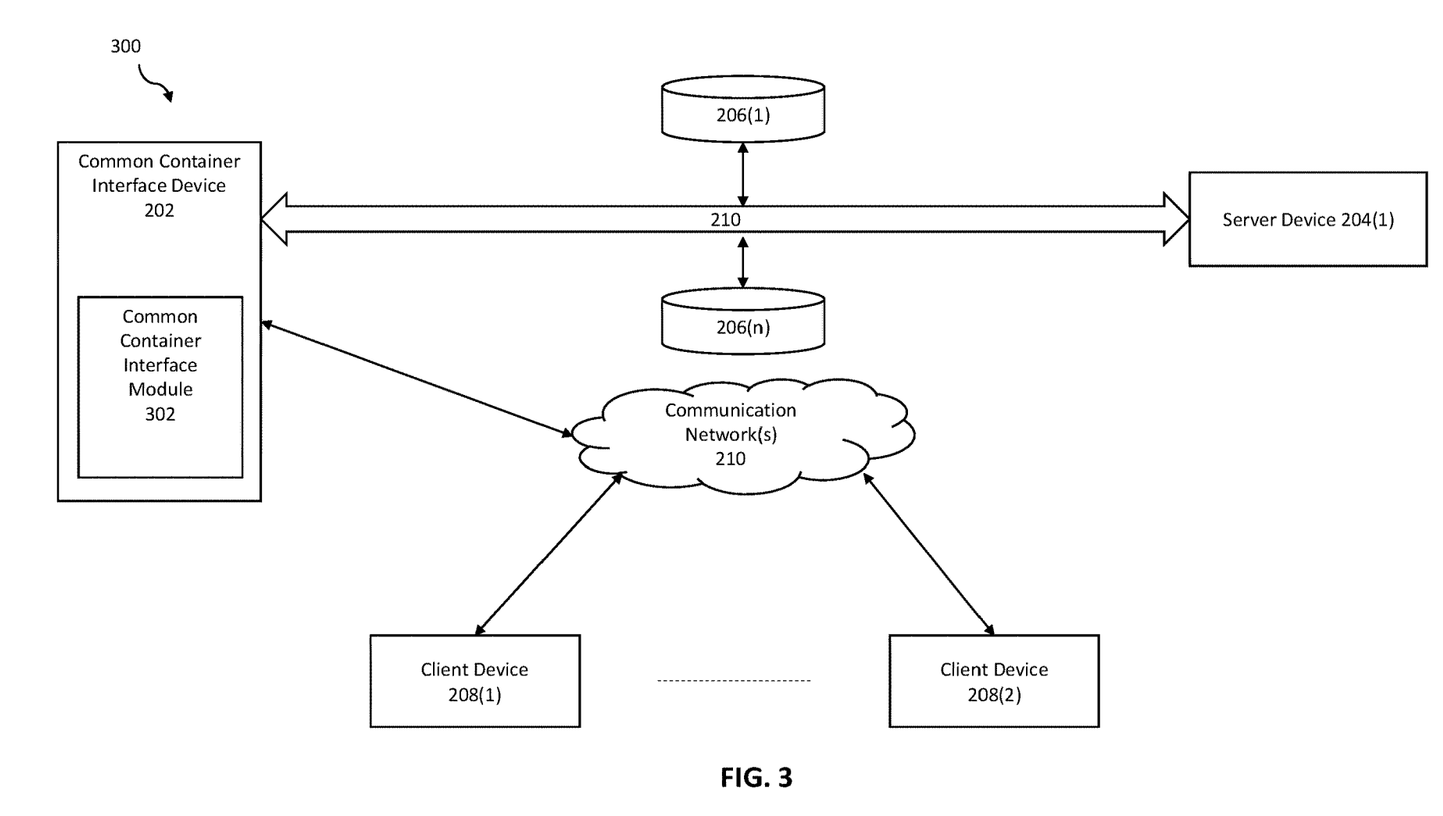
FIG. 3 illustrates an exemplary computing device for implementing a method for running different platform scripts on a same user window in accordance with an exemplary embodiment.

FIG. 3 illustrates an exemplary system for implementing a method for running different platform scripts on a same user window in accordance with an exemplary embodiment. As illustrated in FIG. 3, according to an exemplary embodiments, the system 300 may include a CCI device 202 including a Common Container Interface (CCI) module 302 that may be connected to a server device 204(1) and at least one repository from repositories 206(1) . . . 206(n) via a communication network 210, but the present disclosure is not limited thereto.

The CCI device 202 is described and shown in FIG. 3 as including the CCI module 302, although it may include other rules, policies, modules, databases, or applications, for example. As will be described below, the CCI Module 302 is configured to implement the method for running the different platform scripts on the same user window.

An exemplary process for implementing a mechanism for running the different platform scripts on the same user window by utilizing the network environment of FIG. 2 is shown as being executed in FIG. 3. Specifically, a first client device 208(1) and a second client device 208(2) are illustrated as being in communication with CCI device 202. In this regard, the first client device 208(1) and the second client device 208(2) may be "clients" of the CCI device 202 and are described herein as such. Nevertheless, it is to be known and understood that the first client device 208(1) and/or the second client device 208(2) need not necessarily be "clients" of the CCI device 202, or any entity described in association therewith herein. Any additional or alternative relationship may exist between either or both of the first client device 208(1) and the second client device 208(2) and the CCI device 202, or no relationship may exist.

Further, the CCI device 202 is illustrated as being able to access the at least one repository from repositories 206(1) . . . 206(n). The CCI module 302 may be configured to access these repositories/databases for implementing the method for running the different platform scripts on the same user window.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the CCI device 202 via broadband or cellular communication. Of course, these embodiments are merely exemplary and are not limiting or exhaustive.

Figure 4:
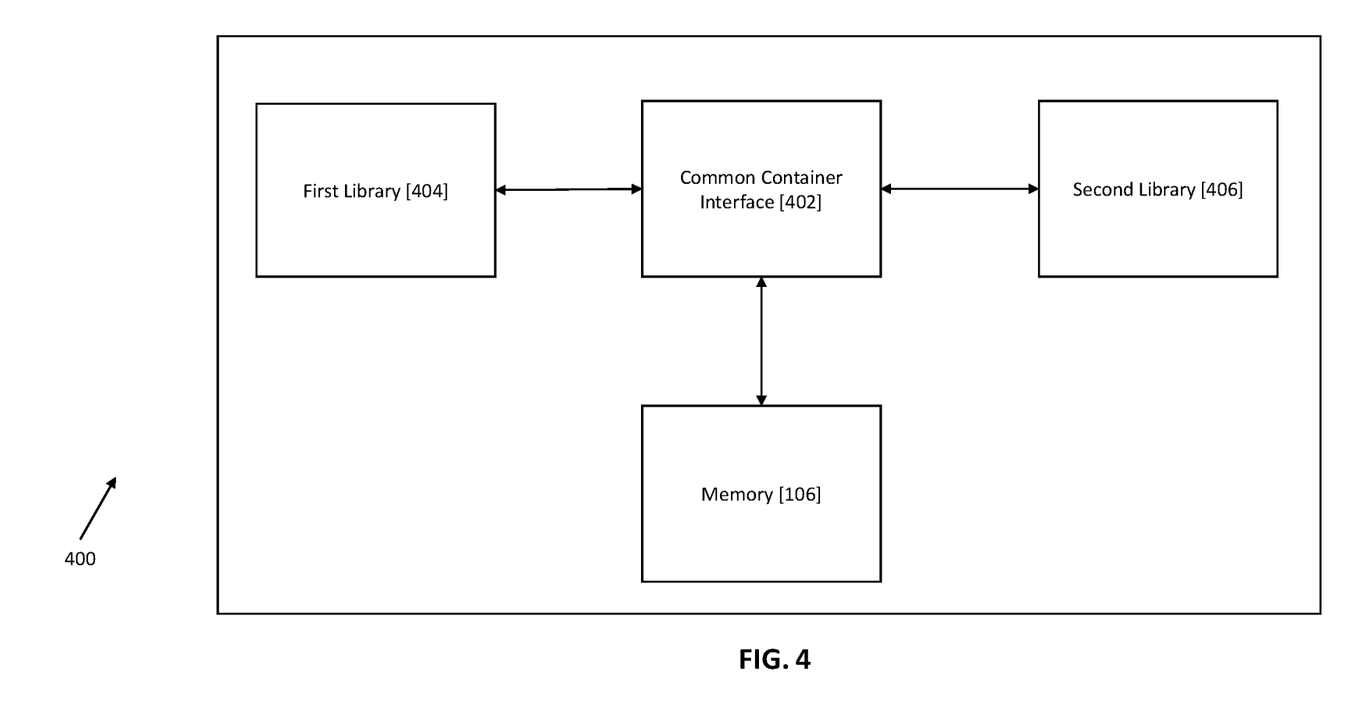
FIG. 4 illustrates a limited set of exemplary components of a computing device for implementing a method for running different platform scripts on a same user window in accordance with an exemplary embodiment.

Referring to FIG. 4, a limited set of exemplary components of a computing device for implementing a method for running different platform scripts on a same user window, in accordance with an exemplary embodiment is disclosed. At least one processor 104 via a common container interface (CCI) 402 interacts with an exemplary first library 404 and an exemplary second library 406 for implementing the method for running the different platform scripts on the same user window, in accordance with the exemplary embodiments. The CCI 402 is also shown to be connected with memory 106 for implementing the features of the present disclosure.

Figure 5:
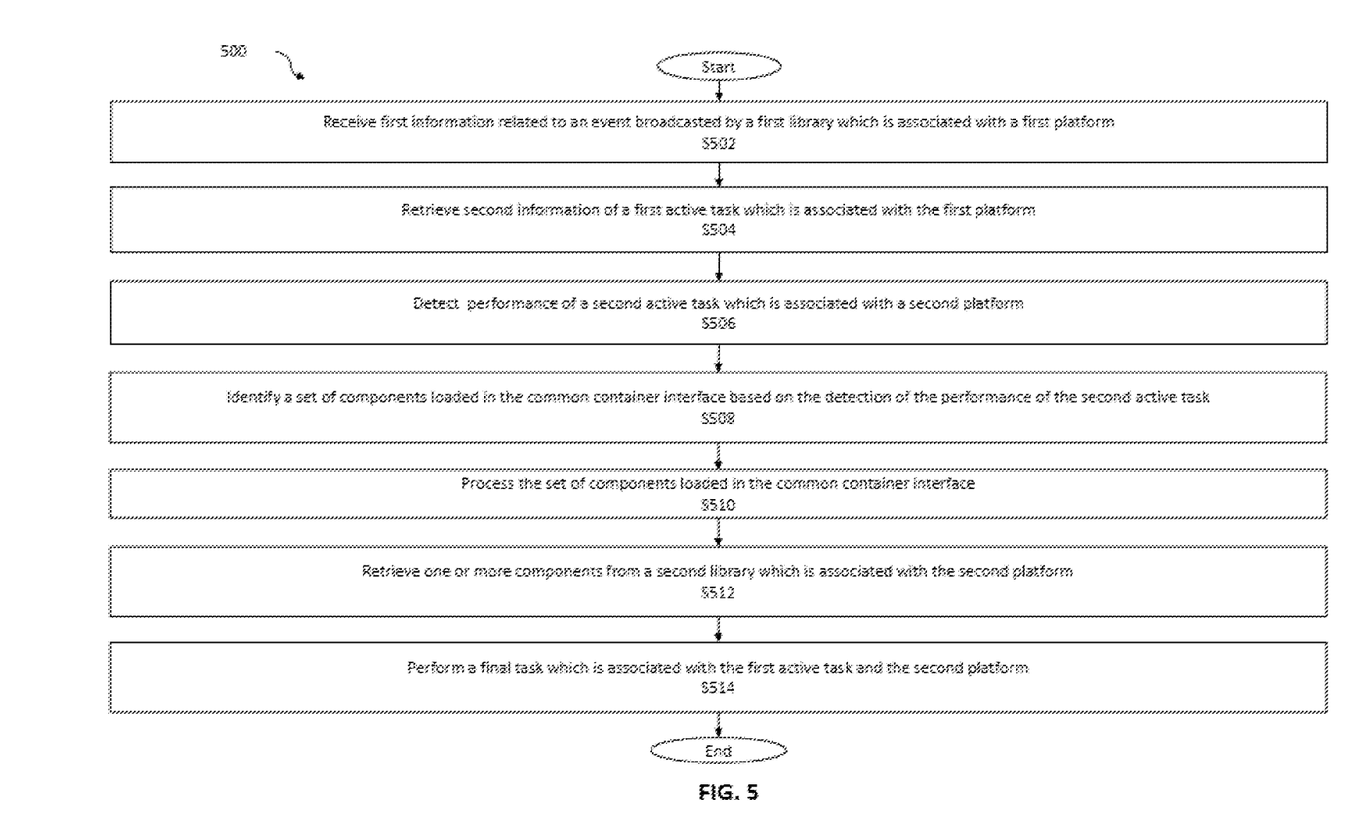
FIG. 5 is a flowchart of an exemplary process for implementing a method for running different platform scripts on a same user window in accordance with an exemplary embodiment.

Referring to FIG. 5, an exemplary method 500 is shown for running different platform scripts on a same user window, the method being executed by at least one processor, in accordance with exemplary embodiment of the present disclosure. As shown in FIG. 5, the method begins at step S502 following a receipt of an information related to an event broadcasted by a first library 404, that is, when the first library 404 broadcasts that a web application programming interface (API) or a browser API is being used by a first library.

At step S502, the method includes receiving, by at least one processor 104 at a common container interface 402, first information related to the event broadcasted by the first library 404, wherein the first library 404 is associated with a first platform. This event may be broadcasted by the first library 404 or the first library that is being used by a user who is on a particular page or a screen of an application or a browser. This screen or page may be built using a platform. Thus, for the purposes of explanation of this disclosure, this page may be referred to as "Menu 1". Say, this first library 404 is associated with the first platform, say for example, the Menu 1 is built using ANGULAR 1. ANGULAR 1, as generally known in the art, is a platform used to build various applications for devices such as desktop computers, laptops, mobile phones, etc. Further, this means that the first library 404, that is associated with the ANGULAR 1, broadcasts an event that the screen is being used by the first library 404. The common container interface 402 receives this information and knows via this information that the user is on a screen that is built using ANGULAR 1. A person skilled in the art would appreciate that the above example is for understanding purposes only and does not limit the invention in any possible manner.

In a non-limiting embodiment, prior to the receiving, by the at least one processor 104 via the common container interface 402, the first information related to the event broadcasted by the first library 404, the method includes loading, by a memory 106 connected to the common container interface 402, components of a plurality of libraries. Say, for example, there are more than one platform available on which a particular application could be built. Therefore, there must be various libraries loaded in the system to run various pages or screens in the particular application to perform different functions, that are built using different platform(s). Thus, all these libraries are loaded initially so that they may be fetched or retrieved via the common container interface 402 as and when required. As used herein, the terms 'fetch', 'fetched' or 'fetching' and 'retrieve', 'retrieved' or 'retrieving', respectively, have been used interchangeably and refer to the same action. Extending this example further, say, there are 2 libraries used to build various screens in an application. The plurality of libraries may, thus, include the at least one component of the first library 404 and the at least one component of the second library 406. These components may be scripts, initialization or bootstrapping procedures, modules for providing various features in the application, etc. Also, components of at least one library of the plurality of libraries may be conflicting with each other, meaning thereby the at least one library may not be compatible with each other. This may imply that some features that operate in a particular way according to one library may not operate in the same way according to the other library. For example, the at least one component of the first library 404 and the at least one component of the second library 406 are conflicting in a way that clicking a search button on one page of the application, according to the first library, opens a dropdown list, while clicking a search button on a second page, according to the second library, opens a text box. Also, in a non-limiting embodiment, the plurality of libraries may be stored in one of the databases 206(1)-206(n), and may accordingly be retrieved by the at least one processor 104 when required. In another non-limiting embodiment, the libraries of the plurality of libraries may be stored in the memory 106, and may accordingly be retrieved by the at least one processor 104 when required.

Further, at step S504, the method includes retrieving, by the at least one processor 104 via the common container interface 402, second information of a first active task, wherein the first active task is associated with the first platform. This information regarding the first active task may be anything related to the first active task. For example, a file is being uploaded by a user using the application on a first screen, for instance, referring to the Menu 1 as used in an above example. This first screen or the Menu 1 is built using one platform technology, say the ANGULAR 1, the components of which are present in the first library 404. Thus, complete module, scripts, etc. for uploading the file would be present in the first library 404 that may be currently loaded in the common container interface 402. The common container interface 402 knows that the first library 404 is being used by the user to perform the task of uploading the file, e.g., the first active task. Also, the common container interface 402 is also aware about what all steps are to be performed that are related to this task of uploading the file. In an example, say, after uploading of the file is completed, an alert notification has to be issued to the user via a user interface informing the user that the file upload is complete. This task of issuing the alert notification may only be performed if the common container interface 402 knows when the uploading of the file is completed. For this purpose, the common container interface 402 either knows all steps of the uploading of the file or at least some relevant checkpoints in this process of uploading of the file.

Further, at step S506, the method includes detecting, by the at least one processor 104 via the common container interface 402, performance of a second active task, wherein the second active task is associated with a second platform. There may be a case that a user wants to jump to another screen of the application. However, the user would prefer that the another screen on which he would be active on, should display the alert notification about completion of the file upload. Thus, in this step, the common container interface 402 detects the performance of the second active task, wherein the second active task is associated with the second platform. Continuing with the above example where the user was on the Menu 1 and performing the task of uploading the file, say, now the user switches to the second screen, say Menu 2. For example, this second screen or the Menu 2 is built on another platform technology such as REACT, and is thus, the at least one component of the second library 406 which as associated with this second screen or the Menu 2, are conflicting with those of the first library 404.

Thus, as soon as the user tries to load a page built on the second platform, the method moves to step S508 where the at least one processor 104 via the common container interface 402 identifies a set of components loaded in the common container interface 402 based on the detection of performance of the second active task. This performance of second active task also includes user trying to switch to the second active task from the first active task. Thus, when the user tries to switch to the new page, that is built, as given in the example above, on the REACT, the common container interface 402 identifies that a library loaded in the common container interface 402 is the first library 404 that is associated with the first active task, and built on the ANGULAR 1 and not on the REACT.

Further, at step S510, the method includes processing, by the at least one processor 104 via the common container interface 402, the set of components loaded in the common container interface 402. In a non-limiting embodiment, this processing via the common container interface 402 may include one of: removing all components of the first library 404 from the common container interface 402 and generating a confirmation of the removal of all the components; and generating a confirmation of a prior-removal of all components of the first library 404. Thus, in this step, the common container interface 402 first checks which library is loaded currently. If the library which is loaded in the common container interface 402 is the same library that is associated with the new screen on which the user wants to switch, then the common container interface 402 only confirms and does not remove the components of this currently loaded library. Alternatively, if the user wants to switch to a screen that is built using another platform that is associated with, for example, the second library 406, the common container interface 402 would first remove all components of the first library 404 and generate a confirmation that all the components of the first library 404 are successfully removed. Also, the removal may happen via making use of meta tags in browser which store link reference to style sheet location.

In a non-limiting embodiment, the common container interface 402 in this step, removes only that at least one component of the first library 404 that is conflicting with the at least one component of the second library 406, and may not remove all components of the first library 404.

Also, the disclosure encompasses the usage of libraries that are self-destroying. These advanced libraries or library units have the feature of destroying, e.g., removing themselves from the common container interface 402. In such a case, the common container interface 402 may not have to destroy or remove library components but may just generate a confirmation that required components have been removed successfully.

Further, at step S512, the method includes retrieving, by the at least one processor 104 via the common container interface 402, at least one component from a second library 406, based on the processing, wherein the second library 406 is associated with the second platform. This processing may be done basis the priority order as determined via the common container interface 402. For example, the user wants to switch to a screen that is built on another platform, say on REACT as opposed to the previous screen that was built on ANGULAR 1, in that case the common container interface 402, retrieves the at least one component of the second library 406. In a non-limiting embodiment, as mentioned above, these components of the second library 406 may be stored in the memory 106 or databases 206(1)-206 (n). Also, in a further non-limiting embodiment, the common container interface 402 in this step retrieves an initialization procedure for initializing the at least one component of the second library 406. These may include various scripts, bootstrapping procedures, links, etc. In a non-limiting embodiment, the initialization or bootstrapping is determined using priority order given to the common container interface 402.

Further, in a non-limiting embodiment, this step of retrieving the at least one component from the second library unit 406 further includes applying, via the common container interface 402, a set of user specific context settings. This applying of the set of user context settings may occur if needed by both libraries to give a cohesive experience to the user. For example, the user while performing some task on the first screen or the Menu 1 changes some user context settings (such as, a user account setting) that affects whole application or needs to be reflected on all screens of the application. For example, a user context setting may be a user name on the user account, that the user changes. As soon as the user made changes to such setting and changes the user account name, the same may get communicated by the first library 404 to the common container interface 402. Thus, at this step S512 in this embodiment, the common container interface 402 passes the information to the second library 406 so that the same information related to this new setting is reflected on the second screen, e.g., the Menu 2.

Further, at step S514, the method includes performing, by the at least one processor 104 via the common container interface 402, a final task based on the at least one component retrieved from the second library 406, wherein the final task is associated with the first active task and the second platform. Thus, the final task is performed that may be related to the first active task that was initiated by the user on the first screen or the Menu 1 that was developed using a particular platform technology. When the user switches to the Menu 2 which is built on another platform technology which is conflicting with the platform technology on which the Menu 1 was built, the common container interface 402 serves as a medium of interaction since both the Menu 1 and the Menu 2 may easily interact with the common container interface 402. Thus, at user's end, the end user gets a seamless cohesive experience as that of a single platform technology-based application even though there is transition between libraries in the background.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and/or "computer-readable storage medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable storage medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for running different platform scripts on a same user window, the method being executed by at least one processor, the method comprising:
   receiving, by the at least one processor at a common container interface, first information related to an event broadcasted by a first library, wherein the first library is associated with a first platform;
   retrieving, by the at least one processor via the common container interface, second information of a first active task, wherein the first active task is associated with the first platform;
   detecting, by the at least one processor via the common container interface, a performance of a second active task, wherein the second active task is associated with a second platform;
   identifying, by the at least one processor via the common container interface, a set of components loaded in the common container interface based on the detection of the performance of the second active task;
   processing, by the at least one processor via the common container interface, the set of components loaded in the common container interface;
   retrieving, by the at least one processor via the common container interface, at least one component from a second library, based on the processing, wherein the second library is associated with the second platform; and
   performing, by the at least one processor via the common container interface, a final task based on the at least one component retrieved from the second library, wherein the final task is associated with the first active task and the second platform.

2. The method as claimed in claim 1, wherein the processing the set of components loaded in the common container interface comprises one from among:
   removing all components of the first library from the common container interface and generating a confirmation of the removal of all the components; and
   generating a confirmation of a prior-removal of all components of the first library.

3. The method as claimed in claim 1, wherein the retrieving the at least one component from the second library includes retrieving, via the common container interface, an initialization procedure for initializing the at least one component of the second library.

4. The method as claimed in claim 1, wherein the retrieving the at least one component from the second library is based on a processing determined by a priority order provided to the common container interface.

5. The method as claimed in claim 1, wherein prior to the receiving the first information related to the event broadcasted by the first library, the method comprises loading, by a memory connected to the common container interface, at least one component of a plurality of libraries including at least one component of the first library and the at least one component of the second library,
   wherein the at least one component of the first library and the at least one component of the second library are conflicting.

6. The method as claimed in claim 1, wherein the step of retrieving the at least one component from the second library comprises applying, by the at least one processor via the common container interface, a set of user context settings.

7. A computing device for running different platform scripts on a same user window, the computing device comprising:
   a processor comprising a common container interface; and
   a memory connected to the processor,
   wherein the processor, via the common container interface, is configured to:
      receive first information related to an event broadcasted by a first library, wherein the first library is associated with a first platform;
      retrieve second information of a first active task, wherein the first active task is associated with the first platform;
      detect a performance of a second active task, wherein the second active task is associated with a second platform;
      identify a set of components loaded in the common container interface based on the detection of the performance of the second active task;
      process the set of components loaded in the common container interface;
      retrieve at least one component from a second library, based on the processing, wherein the second library is associated with the second platform; and
      perform a final task based on the at least one component retrieved from the second library, wherein the final task is associated with the first active task and the second platform.

8. The computing device as claimed in claim 7, wherein the processor is further configured to perform one from among:
   remove all components of the first library from the common container interface and generate a confirmation of the removal of all the components; and
   generate a confirmation of a prior-removal of all components of the first library.

9. The computing device as claimed in claim 7, wherein the processor, while retrieving the at least one component from the second library, is further configured to retrieve an initialization procedure for initializing the at least one component of the second library.

10. The computing device as claimed in claim 7, wherein the processor is further configured to retrieve the at least one component from the second library based on a processing determined by a priority order provided to the common container interface.

11. The computing device as claimed in claim 7, wherein the memory is configured to load at least one component of a plurality of libraries including at least one component of the first library and the at least one component of the second library, prior to the common container interface receiving the first information related to the event broadcasted by the first library,
wherein the at least one component of the first library and the at least one component of the second library are conflicting.

12. The computing device as claimed in claim 7, wherein the processor, while retrieving the at least one component from the second library, is further configured to apply a set of user context settings.

13. A non-transitory computer readable storage medium configured to store instructions for running different platform scripts on a same user window, the instructions comprising executable code which, when executed by a processor, causes the processor to:
receive, via a common container interface, first information related to an event broadcasted by a first library, wherein the first library is associated with a first platform;
retrieve second information of a first active task, wherein the first active task is associated with the first platform;
detect a performance of a second active task, wherein the second active task is associated with a second platform;
identify a set of components loaded in the common container interface based on the detection of the performance of the second active task;
process the set of components loaded in the common container interface;
retrieve at least one component from a second library, based on the processing, wherein the second library is associated with the second platform; and
perform a final task based on the at least one component retrieved from the second library, wherein the final task is associated with the first active task and the second platform.

14. The storage medium as claimed in claim 13, wherein when executed by the processor, the executable code further causes the processor to perform, via the common container interface, one from among:
remove all components of the first library from the common container interface and generate a confirmation of the removal of all the components; and
generate a confirmation of a prior-removal of all components of the first library.

15. The storage medium as claimed in claim 13, wherein when executed by the processor, the executable code further causes the processor to:
retrieve, via the common container interface, an initialization procedure for initializing the at least one component of the second library.

16. The storage medium as claimed in claim 13, wherein when executed by the processor, the executable code further causes the processor to:
retrieve, via the common container interface, the at least one component from the second library based on a processing determined by a priority order provided to the common container interface.

17. The storage medium as claimed in claim 13, wherein when executed by the processor, the executable code further causes the processor to enable a memory to load at least one component of a plurality of libraries including at least one component of the first library and the at least one component of the second library, prior to the common container interface receiving the first information related to the event broadcasted by the first library,
wherein the at least one component of the first library and the at least one component of the second library are conflicting.

18. The storage medium as claimed in claim 13, wherein when executed by the processor, the executable code further causes the processor to:
apply, via the common container interface, a set of user context settings, while retrieving the at least one component from the second library.

* * * * *